United States Patent Office 3,006,757
Patented Oct. 31, 1961

3,006,757
COPPER BASE BRAZING ALLOY
AND MIXTURES
George S. Hoppin III, Cincinnati, and Kimble S. Songer, Hamilton, Ohio, assignors to General Electric Company, a corporation of New York
No Drawing. Filed Oct. 3, 1960, Ser. No. 59,793
4 Claims. (Cl. 75—159)

This invention relates to copper base brazing alloys including nickel, silicon and manganese and to mixtures of such powdered alloys with iron powder for the brazing of wide-gaps.

An inherent problem that has long limited the application of furnace brazing to the fabrication of large sheet metal structures is the requirement that all joints to be brazed must have essentially capillary (0.002″–0.006″) clearances. The manufacturing cost inherent in obtaining such close tolerances on large fabricated structures have been sufficiently high to preclude the use of standard brazing processes. Recent work has led to the development and successful application of brazing materials and furnace technique to reliably and reproducibly braze parts with joint gaps up to about 0.06″, considered to be a "wide-gap."

The success of "wide-gap" furnace brazing processes was found to be contingent on very close control of such variables as (1) the use of sluggish brazing materials containing both solid and liquid phases at the brazing temperature, (2) the ratio of constituents in these brazing materials, (3) the brazing temperature, (4) heating and cooling rates, (5) furnace atmospheres and (6) joint designs.

It is the principal object of this invention to provide an improved copper base brazing alloy particularly suitable for use in wide-gap brazing techniques.

Another object is to provide a mixture of a brazing alloy and another metal powder to contain both solid and liquid phases at the brazing temperature in order that the brazing material be sluggish enough to bridge wide-gaps while maintaining the brazing temperature below that which would cause damage through heating to the materials being joined.

Briefly stated, in accordance with one aspect of this invention there is provided a copper base brazing alloy consisting essentially of, by weight, 27–29% nickel, 1.8–2.2% silicon, 9.7–10.3% manganese with the balance essentially copper.

In another form the present invention consists of a mixture of 75–85 weight percent of the Ni-Si-Mn-Cu base brazing alloy in the range defined above, with about 15–25 weight percent of iron powder.

The development of new brazing materials and techniques for "wide-gap" brazing stemmed from a need for an improved fabrication process for high temperature operating apparatus such as in propulsion equipment many of the parts of which were made from difficult to weld high temperature "super alloys," for example of the nickel base type. The problem of weld cracking in these parts has been a serious one. Generally such parts are sufficiently large, for example 3 to 4 feet in diameter, that normal manufacturing procedures and tolerances result in "fitups" between detail parts that can range from line contact to 0.06″ spacings. The application of conventional brazing alloys was therefore impossible in that such brazing materials allow no more than about 0.005″ joint clearances.

The mechanism by which wide-gap brazing materials bridge large gaps was postulated as follows: at brazing temperature, one alloy powder melts while the other does not. The result is a viscous slurry having poor flow characteristics formed wherever the powders have been preplaced. This slurry then metallurgically bonds itself to the two abutting members of the assembly, producing a "wide-gap brazed" joint.

It was unexpectedly found that a copper base alloy consisting essentially of 27–29 weight percent nickel, 1.8–2.2 weight percent silicon, 9.7–10.3 weight percent manganese with the balance copper is unusually well suited for use as a brazing alloy in connection with wide-gap brazing techniques. This material which has a solidus temperature of about 1800° F. and a liquidus temperature of about 2000° F. can be brazed as low as 2050° F. Such a low brazing temperature is particularly advantageous for use with austenitic materials. Formerly reported wide-gap brazing materials were unsuited for many applications because of their relatively high brazing temperatures, for example about 2200° F. Such temperature was above the grain growth temperature of most austenitic materials and near the incipient melting temperature of some.

It has been found that the Ni-Si-Mn-Cu base alloy of this invention when mixed with about 15–25 weight percent of elemental iron powder results in a sound joint when brazed at a temperature of about 2050° F.

In order to determine the useful range for the mixture of the alloy of this invention with iron powder, a number of tests were performed of which the following examples are representative:

Example I

Two segments of an article of a nickel base alloy consisting by weight of about 19% Cr, 0.006% B, 11% Co, 9.8% Mo, 3.2% Ti, 1.5% Al with the balance nickel and impurities were nickel plated, cleaned to remove grease and surface dirt and fixtured in wide-gap relationship. A mixture of about 80 weight percent of the powdered Cu base alloy consisting essentially of, by weight, 28% Ni, 2% Si, 10% Mn with the balance essentially Cu and about 20 weight percent of elemental Fe powder was applied to the joint. The fixtured segments were placed in a hydrogen atmosphere retort and the retort placed in a furnace. The following cycle was used: The furnace was taken from room temperature to 1650° F. where it was held for 10 minutes and then rapidly increased to 2050° F. where it was held for 20 minutes. The specimens and furnace were cooled to 1690° F. at which point the retort was removed from the furnace and rapidly quenched. Tests of the specimen showed that there was a sound bond at the brazed joint.

Example II

The procedure of Example I was repeated except that only 10 weight percent of iron powder was added to 90 weight percent of the copper base brazing alloy of Example I. The result was that the brazing mixture was too fluid and did not adequately braze the wide-gap.

The addition of iron powder in excess of about 25 weight percent to the copper base brazing alloy of this invention can result in a brazing mixture which is too sluggish and which has an excessively high brazing temperature for the purpose of the mixture of this invention.

Similar tests using an A.I.S.I. type 410 stainless steel was performed at brazing temperatures of about 2050° F. Because this brazing temperature corresponds with the solutioning temperature of that stainless steel, the heat treating cycle generally necessary after brazing was thus eliminated. The use of the alloy and mixture of this invention results in less distortion and eliminates loss of strength in brazing such materials as A.I.S.I. type 410 stainless steel.

The brazing mixture of this invention, after brazing into a solid body, can be forged and cold rolled indicating that it has the necessary ductility for its application to many structural parts.

Although this invention has been described in connection with specific examples, it will be readily understood by those skilled in the art, the variations and modifications which are capable of this invention.

What is claimed is:

1. An improved copper base brazing alloy consisting essentially of, by weight, 27–29% Ni, 1.8–2.2% Si, 9.7–10.3% Mn with the balance Cu.

2. An improved copper base brazing alloy consisting essentially of, by weight, 28% Ni, 2% Si, 10% Mn, with the balance essentially Cu.

3. A mixture of powdered metals suitable for brazing wide-gaps consisting essentially of 75–85 weight percent of a Cu base brazing alloy consisting essentially of, by weight, 27–29% Ni, 1.8–2.2% Si, 9.7–10.3 Mn, 15–25 weight percent Fe, and the balance Cu.

4. A mixture of powdered metals suitable for brazing wide-gaps consisting essentially of 80 weight percent of a Cu base brazing alloy consisting essentially of, by weight, 27–29% Ni, 1.8–2.2% Si, 9.7–10.3 Mn, 20 weight percent Fe, and the balance Cu.

References Cited in the file of this patent

UNITED STATES PATENTS 2,215,905     Kihlgren _____ Sept. 24, 1940